(12) United States Patent
Cohen et al.

(10) Patent No.: US 6,862,166 B2
(45) Date of Patent: Mar. 1, 2005

(54) CAPACITOR

(76) Inventors: Michael Cohen, Kibbutz Kfar Etzion, Mobile Post North Yehuda 90200 (IL); Shalom Itzhak Cohen, 4A Hazayik Street, Nizzan 79290 (IL)

( * ) Notice: Subject to any disclaimer, the term of this patent is extended or adjusted under 35 U.S.C. 154(b) by 0 days.

(21) Appl. No.: 10/781,490

(22) Filed: Feb. 17, 2004

(65) Prior Publication Data

US 2004/0179327 A1 Sep. 16, 2004

(30) Foreign Application Priority Data

Feb. 24, 2003 (IL) .................................................. 154598

(51) Int. Cl.⁷ ............................ H01G 4/06; C04B 35/03
(52) U.S. Cl. ................................ 361/321.4; 361/321.5; 501/127; 501/105
(58) Field of Search .......................... 361/321.1, 321.2, 361/321.3, 321.4, 321.5, 311–313, 301.4; 501/139, 127, 105

(56) References Cited

U.S. PATENT DOCUMENTS

| 3,819,990 | A | * | 6/1974 | Hayashi et al. | ............. 361/313 |
| 5,668,694 | A | * | 9/1997 | Sato et al. | ............... 361/321.4 |
| 5,747,396 | A | * | 5/1998 | Miyakoshi et al. | ........... 501/32 |
| 6,344,427 | B1 | * | 2/2002 | Komatsu et al. | ............ 501/138 |

* cited by examiner

*Primary Examiner*—Eric Thomas
(74) *Attorney, Agent, or Firm*—Fulbright & Jaworski LLP

(57) ABSTRACT

The invention provides a ceramic capacitor including a ceramic dielectric body at least two spaced-part electrodes in contact with the body wherein at least 80 weight percent of the body consists of alumina, the body further including at least 0.5 $BaTiO_3$ w/w %, at least 0.5 w/w % MgO, <0.05 w/w % $SiO_2$, at least 4.5 w/w % $ZrO_2$ and at least 0.07 w/w % $HfO_2$.

7 Claims, 1 Drawing Sheet

CAPACITOR

CROSS REFERENCE TO RELATED APPLICATIONS

Not applicable.

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE INVENTION

1. Field of the Invention

The present invention relates to a capacitor. More particularly, the present invention relates to a capacitor comprising a ceramic dielectric and at least two electrodes, said dielectric being predominantly composed of a dielectric ceramic composition whose main component comprises alumina and which further comprises barium titanium oxide, magnesium oxide, silicon oxide, zirconium oxide and hafnium oxide.

As is known a capacitor is an electric circuit element used to store charge temporarily, consisting in general of two metallic plates separated and insulated from each other by a dielectric. Thus a capacitor is most simply defined as two conductors separated by a dielectric.

More specifically, a capacitor is a passive electronic component that stores energy in the form of an electrostatic field. In its simplest form, a capacitor consists of two conducting plates separated by an insulating material called the dielectric, The capacitance is directly proportional to the surface areas of the plates, and is inversely proportional to the separation between the plates. Capacitance also depends on the dielectric constant of the substance separating the plates.

The standard unit of capacitance is the farad, abbreviated F. This is a large unit; more common units are the microfarad, abbreviated $\mu F$ (1 $\mu F = 10^{-6}$ F) and the picofarad, abbreviated pF (1 pF=$10^{-12}$ F).

Capacitors can be fabricated onto integrated circuit (IC) chips. They are commonly used in conjunction with transistors in dynamic random access memory (DRAM). The capacitors help maintain the contents of memory. Because of their tiny physical size, these components have low capacitance.

They must be recharged thousands of times per second or the DRAM will lose its data.

Capacitors prepared according to the present invention are not only suitable for integrated circuit chips but are in fact suitable for all known capacitor uses.

Large capacitors are used in the power supplies of electronic equipment of all types, including computers and their peripherals. In these systems, the capacitors smooth out the rectified utility AC, providing pure, battery-like DC.

A dielectric is a material that is a good insulator (incapable of passing electrical current), but is capable of passing electrical fields of force.

Thus as is known, a good dielectric should also have other properties. It must resist breakdown under high voltages; it should not itself draw appreciable power from the circuit, it must have reasonable physical stability; and none of its characteristics should vary much over a fairly wide temperature range. One important application of dielectrics is as the material separating the plates of a capacitor. A capacitor with plates of a given area will vary in its ability to store electric charge depending on the material separating the plates. On the basis of this variation each insulating material can be assigned a dielectric constant. Generally, the dielectric constant of air is defined as 1 and other dielectric constants are determined with reference to it. Other properties of interest in a dielectric are dielectric strength, a measure of the maximum voltage it can sustain without significant conduction, and the degree to which it is free from power losses.

Dielectric strength is a measure of the electrical strength of a material as an insulator, Dielectric strength is defined as the maximum voltage required to produce a dielectric breakdown through the material and is expressed as Volts per unit thickness. The higher the dielectric strength of a material the better its quality as an insulator.

The dielectric strength of an insulator is the critical electric field beyond which the molecules in the dielectric stretch so much that one or more electrons are ripped free from the molecules. When this happens, the free electrons crash into other stretched molecules, knocking other electrons free; the resulting chain reaction is a spark that burns a hole through the dielectric. If this happens to the dielectric in a capacitor, the capacitor is usually ruined.

Thus an extremely desirable characteristic of a dielectric is a high dielectric constant.

2. Description of Related Art

As is known and described e.g. in U.S. Pat. No. 5.790,367 the quality of multilayer capacitors is determined by the chemical composition of their dielectrics and of the electrodes.

The use of barium titanium oxide otherwise known as barium titanate has been described in the prior art including in the above mentioned patent and in many other patents such as U.S. Pat. Nos. 4,219,866; 3,987,347 to mention but a few.

Similarly the use of alumina as a possible component in a dielectric composition is also mentioned in the prior art e.g. in U.S. Pat. No. 4,670,815.

Nevertheless, none of said patents teach nor suggest the combination of a major proportion of alumina and a minor proportion of barium titanium oxide together with other components to form a superior capacitor having a surprisingly high dielectric constant as well as excellent structural and electrical stability.

BRIEF SUMMARY OF THE INVENTION

Thus according to the present invention there is now provided a ceramic capacitor comprising a ceramic dielectric body and at least two spaced-apart electrodes in contact with said body wherein at least 80 weight percent of said body consists of alumina said body further comprising at least 0.5 $BaTiO_3$ w/w %, at least 0.5 w/w % MgO, <0.05 w/w % $SiO_2$, at least 4.5 w/w % $ZrO_2$ and at least 0.07 w/w % $HfO_2$. The designation w/w % as used throughout the specification and claims means weight per weight percent In preferred embodiments of the present invention there is provided a ceramic capacitor wherein the ceramic dielectric body comprises between 0.5 and 15 w/w % $BaTiO_3$.

In especially preferred embodiments of the present invention there is provided a ceramic capacitor as defined wherein said ceramic dielectric body comprises between about 80–92 w/w % $Al_2O_3$, about 0.5 and 15 w/w % $BaTiO_3$, about 0.5–1.0 w/w % MgO, about <0.05–1.0 w/w % $SiO_2$, about 4.5–7.5 w/w % $ZrO_2$ and about 0.07–0.13 w/w % $HfO_2$ and wherein the sum of the components does not exceed 100%.

Preferably said ceramic dielectric body comprises up to 15 w/w % $BaTiO_3$, up to 1.0 w/w % MgO, up to 92 w/w % $Al_2O_3$, up to 1 w/w % $SiO_2$, Up to 7.5 w/w % $ZrO_2$ and up to 0.125 w/w % $HfO_2$.

In especially preferred embodiments of the present invention said ceramic dielectric body comprises about 90.5 w/w % $Al_2O_3$, 2.5 w/w % $BaTiO_3$, <0.05 w/w % $SiO_2$, 6 w/w % $ZrO_2$, 0.6 w/w % MgO and 0.1 w/w % $HfO_2$.

In other preferred embodiments of the present invention 6 said ceramic dielectric body comprises about 87 w/w % $Al_2O_3$, 6 w/w % $BaTiO_3$, 0.05 w/w % $SiO_2$, 6 w/w % $ZrO_2$, 0.6 w/w % MgO and 0.1 w/w % $HfO_2$.

In Israel Specification 135,936 and in corresponding published US Application 20020010071 there is described and claimed a sintered, alumina ceramic product comprising about 90–97.5 w/w % $Al_2O_3$, about 0.5–1.0 w/w % MgO, about <0.05–1.0 w/w % $SiO_2$, about 4.5–7.5 w/w % $ZrO_2$ and about 0.07–0.13 w/w % $HfO_2$ and wherein the sum of the components does not exceed 100%.

In Bald specification said product is described as being useful as a ceramic pellet for use in an armor panel although it is also mentioned in said specification that the surprising homogenity and uniformity of the ceramic products produced from said composition enables the use thereof in electrically related applications. In said context however, the characteristic described was that the bulk resistivity of a plurality of products prepared from the same batch exhibits a standard deviation of less than 0.1.

As will be seen in comparative Example 3 hereinafter the dielectric constant of capacitors produced from compositions described in said specification range between 11.32 and 13.65 while the dielectric constant of capacitors produced from the compositions of the present invention have a dielectric constant in excess of 23.

Thus neither Bald specification nor the prior art patents teach or suggest the composition of the present invention or the superior properties thereof.

While the invention will now be described in connection with certain preferred embodiments in the following examples and with reference to the accompanying figure so that aspects thereof may be more fully understood and appreciated, it is not intended to limit the invention to these particular embodiments. On the contrary, it is intended to cover all alternatives, modifications and equivalents as may be included within the scope of the invention as defined by the appended claims. Thus, the following examples which include preferred embodiments will serve to illustrate the practice of this invention, it being understood that the particulars shown are by way of example and for purposes of illustrative discussion of preferred embodiments of the present invention only and are presented in the cause of providing what is believed to be the most useful and readily understood description of formulation procedures as well as of the principles and conceptual aspects of the invention.

BRIEF DESCRIPTION OF THE DRAWINGS

In the drawings:

The figure is a graphic representation of the dielectric constant k of 5 ceramic bodies produced according to formulations 1–5 hereinafter from Israel Specification 135,936.

DETAILED DESCRIPTION OF THE INVENTION

Example 1

Figure 1:
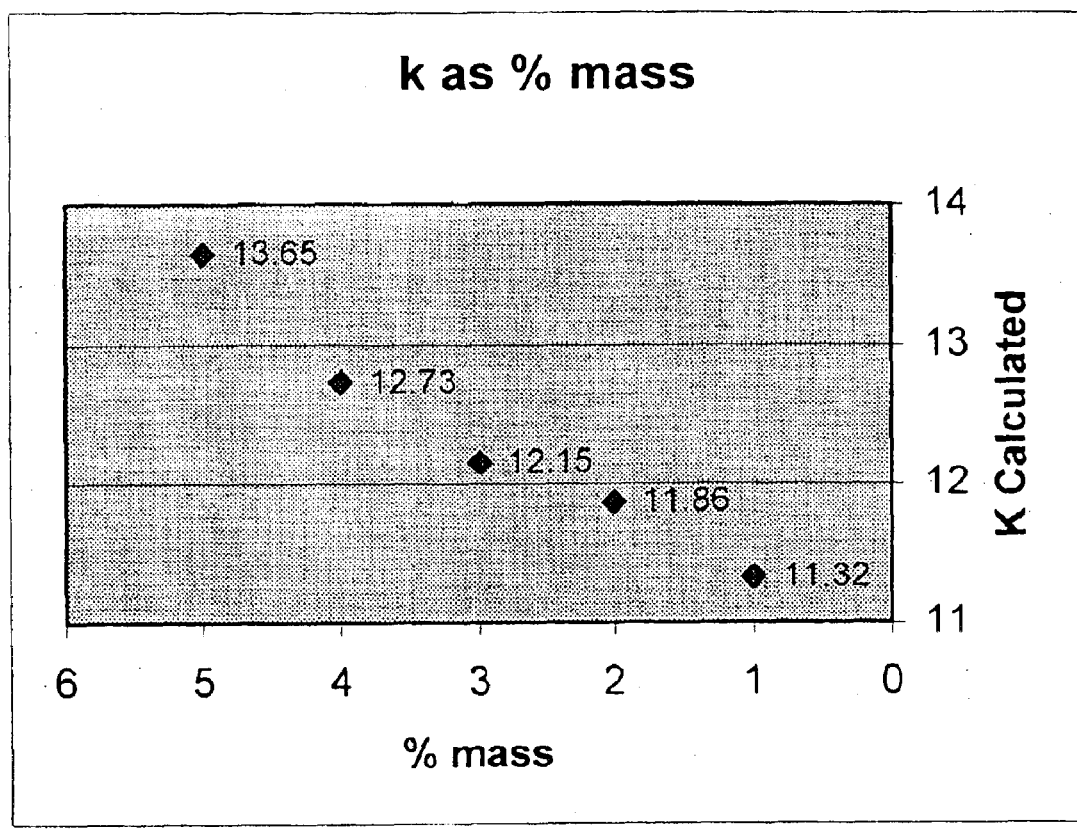

A plurality of ceramic dielectric bodies were prepared from Al2O3 ceramic powder ground to a size of about 180–200 microns and combined in the following ratio of about 90.12 w/w % $Al_2O_3$, 2.5 w/w % $BaTiO_3$, <0.05 w/w % $SiO_2$, 6 w/w % $ZrO_2$, 0.1 w/w % $HfO_2$, 0.6 w/w % MgO, 0.2 w/w % $Na_2O$, 0.02 w/w % $P_2O_5$, 0.01 w/w % $K_2O$, 0.1 w/w % CaO, 0.01 w/w % $TiO_2$, 0.02 w/w % $Fe_2O_3$, 0.2 w/w % CuO, 0.02 w/w % ZnO, 0.5 w/w % BaO, and 0.04 w/w % $Y_2O_3$.

The ground powder, after cleaning, is pressed in a suitable mold using special Tungsten Carbide tooling, having a pressure of 70 tons for about two seconds, to form dielectric ceramic bodies. The bodies which are formed were then placed in a tray for transfer to a sintering oven. The bodies were then sintered at a temperature of 1,700° C. for seventy-two hours, after which the sintered shapes are removed from the sinter oven and allowed to cool at room temperature.

Example 2

A plurality of ceramic dielectric bodies were prepared from $Al_2O_3$ ceramic powder ground to a size of about 180–200 microns and combined in the following ratio of about 86.62 w/w % $Al_2O_3$, 6 w/w % $BaTiO_3$, <0.05 w/w % $SiO_2$, 6 w/w % $ZrO_2$, 0.1 w/w % $HfO_2$, 0.6 w/w % MgO, 0.2 w/w % $Na_2O$, 0.02 w/w % $P_2O_5$, 0.01 w/w % $K_2O$, 0.1 w/w % CaO, 0.01 w/w % $TiO_2$, 0.02 w/w % $Fe_2O_3$, 0.2 w/w % CuO, 0.02 w/w % ZnO, 0.5 w/w % BaO, and 0.04 w/w % $Y_2O_3$.

The ground powder, after cleaning, is pressed in a suitable mold using special Tungsten Carbide tooling, having a pressure of 70 tons for about two seconds, to foam dielectric ceramic bodies. The bodies which are formed were then placed in a tray for transfer to a sintering oven. The bodies were then sintered at a temperature of 1,700°C. for seventy-two hours, after which the sintered shapes are removed from the sinter oven and allowed to cool at room temperature.

While in Examples 1 and 2 the bodies were sintered at a temperature of 1,700° C. it is to be noted that sintering can be carried out at a preferred temperature range of about 800° C. to 1,700°C. depending on the nature of the electrodes used for producing the capacitor.

Comparative Example 3

A plurality of five different dielectric ceramic bodies were prepared according to the teachings of Israel Specification 135,936 and the components thereof are set forth in the following Table 1.

TABLE 1

| Material | % mass 1 | % mass 2 | % mass 3 | % mass 4 | % mass 5 |
|---|---|---|---|---|---|
| $Na_2O$ | 0.2 | 0.17 | 0.1 | 0.1 | 0.1 |
| MgO | 0.6 | 0.63 | 0.4 | 0.4 | 0.4 |
| $Al_2O_3$ | 93 | 91 | 88 | 86 | 84 |
| $SiO_2$ | <0.05 | 0.06 | 0.3 | 0.3 | 0.3 |
| $P_2O_5$ | 0.02 | | | | |
| $1_{(2}0$ | 0.01 | 0.01 | 0.01 | 0.01 | 0.01 |
| CaO | 0.1 | 0.1 | 0.1 | 0.1 | 0.1 |
| $TiO_2$ | 0.01 | 0.017 | 0.02 | 0.02 | 0.02 |
| $Fe_2O_2$ | 0.02 | 0.027 | 0.03 | 0.03 | 0.03 |

TABLE 1-continued

| Material | % mass 1 | % mass 2 | % mass 3 | % mass 4 | % mass 5 |
|---|---|---|---|---|---|
| CuO | 0.2 | | | | |
| ZnO | 0.02 | | | | |
| BaO | <0.05 | | | | |
| $ZrO_2$ | 6 | 8 | 11 | 13 | 15 |
| $Y_2O_3$ | 0.04 | 0.04 | 0.04 | 0.04 | 0.04 |
| $HfO_2$ | 0.1 | 0.1 | 0.1 | 0.1 | 0.1 |

The dielectric constant of these different bodies was measured and the result of said measurement is shown in Table 2 hereinafter and in FIG. 1 appended hereto.

TABLE 2

| Sample | 1 | 2 | 3 | 4 | 5 |
|---|---|---|---|---|---|
| K | 11.32 | 11.86 | 12.15 | 12.73 | 13.65 |

In contradistinction the dielectric constant of the product of Example 1 was calculated as being 23.23 while the product of Example 2 was calculated as being 25.74.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as restrictive reference being made to the appended claims, rather than to the foregoing description and all changes which come within the meaning and range of equivalency of the claims are therefore intended to be embraced therein.

What is claimed is:

1. A ceramic capacitor comprising a ceramic dielectric body and at least two spaced-apart electrodes in contact with said body wherein at least 80 weight percent of said body consists of alumina, said body further comprising at least 0.5 $BaTiO_3$ w/w %, at least 0.5 w/w % MgO, less than 0.05 w/w % ba $SiO_2$, at least 4.5 w/w % $ZrO_2$ and at least 0.07 w/w % $HfO_2$.

2. A capacitor according to claim 1 comprising between 0.5 and 15 w/w % $BaTiO_3$.

3. A ceramic capacitor according to claim 1 wherein said ceramic dielectric body comprises between about 80–92 w/w % $Al_2O_3$, about 0.5 and 15 w/w % $BaTiO_3$, about 0.5–1.0 w/w % MgO, about less than 0.05–1.0 w/w % $SiO_2$, about 4.5–7.5 w/w % $ZrO_2$ and about 0.07–0.13 w/w % $HfO_2$ and wherein the sum of the components does not exceed 100%.

4. A ceramic capacitor according to claim 1 wherein said ceramic dielectric body comprises up to 15 w/w % $BaTiO_3$, up to 1.0 w/w % MgO up to 92 w/w % $Al_2O_3$, Up to 1 w/w % $SiO_2$, up to 7.5 w/w % $ZrO_2$ and up to 0.125 w/w % $HfO_2$.

5. A ceramic capacitor according to claim 1 wherein said ceramic dielectric body comprises about 90.5 w/w % $Al_2O_3$, 2.5 w/w % $BaTiO_3$, less than 0.05 w/w % $SiO_2$, 6 w/w % $ZrO_2$, 0.6 w/w % MgO and 0.1 w/w % $HfO_2$.

6. A ceramic capacitor according to claim 1 wherein said ceramic dielectric body comprises about 87 w/w % $Al_2O_3$, 6 w/w % $BaTiO_3$<0.05 w/w % $SiO_2$, 6w/w % $ZrO_2$, 0.6 w/w % MgO and 0.1 w/w % $HfO_2$.

7. A ceramic capacitor according to claim 1 wherein said ceramic dielectric body has a dielectric constant of at least 23.

* * * * *